United States Patent
Li et al.

(10) Patent No.: US 11,390,564 B2
(45) Date of Patent: Jul. 19, 2022

(54) CERAMIC MATERIAL AND METHOD FOR PREPARING THE SAME

(71) Applicant: University of Electronic Science and Technology of China, Chengdu (CN)

(72) Inventors: Enzhu Li, Chengdu (CN); Hongyu Yang, Chengdu (CN); Hongcheng Yang, Chengdu (CN); Yawei Chen, Chengdu (CN); Chaowei Zhong, Chengdu (CN); Shuren Zhang, Chengdu (CN)

(73) Assignee: UNIVERSITY OF ELECTRONIC SCIENCE AND TECHNOLOGY OF CHINA, Chengdu (CN)

( * ) Notice: Subject to any disclaimer, the term of this patent is extended or adjusted under 35 U.S.C. 154(b) by 0 days.

(21) Appl. No.: 16/713,026

(22) Filed: Dec. 13, 2019

(65) Prior Publication Data

US 2020/0189980 A1    Jun. 18, 2020

(30) Foreign Application Priority Data

Dec. 14, 2018  (CN) .......................... 201811529803.0

(51) Int. Cl.
    *C04B 35/495*  (2006.01)

(52) U.S. Cl.
    CPC .... *C04B 35/495* (2013.01); *C04B 2235/3232* (2013.01); *C04B 2235/3253* (2013.01); *C04B 2235/3275* (2013.01)

(58) Field of Classification Search
    CPC .......... C04B 35/495; C04B 2235/3232; C04B 2235/3253; C04B 2235/3275
    See application file for complete search history.

(56) References Cited

FOREIGN PATENT DOCUMENTS

| CN | 107117967 A | * | 9/2017 |
| CN | 107140981 A | * | 9/2017 |
| KR | 20110066906 A | * | 6/2011 |

OTHER PUBLICATIONS

Huang, Xin, et al. "Relationship of crystal structure and microwave dielectric properties in Ni0. 5Ti0. 5NbO4 ceramics with Ta substitution." European Journal of Inorganic Chemistry 2018.17 (Mar. 25, 2018): 1800-1804. (Year: 2018).*

* cited by examiner

*Primary Examiner* — Karl E Group
*Assistant Examiner* — Cameron K Miller
(74) *Attorney, Agent, or Firm* — Matthias Scholl P.C.; Matthias Scholl

(57) ABSTRACT

A ceramic material including $Co_{0.5}Ti_{0.5}TaO_4$. The ceramic material is prepared as follows: 1) weighting and mixing raw powders of $Co_2O_3$, $TiO_2$ and $Ta_2O_5$ proportioned according to the chemical formula of $Co_{0.5}Ti_{0.5}TaO_4$, to yield a mixture; 2) mixing the mixture obtained in 1), zirconia balls, and deionized water according to a mass ratio of 1:4-6:3-6, ball-milling for 6-8 h, drying at 80-120° C., sieving with a 60-200 mesh sieve, calcining in air atmosphere at 800-1100° C. for 3-5 h, to yield powders comprising a main crystalline phase of $Co_{0.5}Ti_{0.5}TaO_4$; and 3) mixing the powders obtained in 2), zirconia balls, and deionized water according to a mass ratio of 1:3-5:2-4, ball-milling for 4-6 h, and drying at 80-100° C.; adding a 2-5 wt. % of polyvinyl alcohol solution to a resulting product, granulating, sintering resulting granules at 1000-1100° C. in air atmosphere for 4-6 h.

5 Claims, 2 Drawing Sheets

CERAMIC MATERIAL AND METHOD FOR PREPARING THE SAME

CROSS-REFERENCE TO RELATED APPLICATIONS

Pursuant to 35 U.S.C. § 119 and the Paris Convention Treaty, this application claims foreign priority to Chinese Patent Application No. 201811529803.0 filed Dec. 14, 2018, the contents of which, including any intervening amendments thereto, are incorporated herein by reference. Inquiries from the public to applicants or assignees concerning this document or the related applications should be directed to: Matthias Scholl P. C., Attn: Dr. Matthias Scholl Esq., 245 First Street, 18th Floor, Cambridge, Mass. 02142.

BACKGROUND

The disclosure relates to a $Co_{0.5}Ti_{0.5}TaO_4$ ceramic material and a method for preparing the same.

Conventional trirutile $CoTa_2O_6$ microwave dielectric ceramics has moderate dielectric constant: $\varepsilon_r=29$, $Q \times f=2300$ GHz, $\tau f=23$ ppm/° C. when sintered at 1500° C. Other microwave dielectric ceramics with trirutile structure ($MgTa_2O_6$, $NiTa_2O_6$) also requires a sintering temperature higher than 1500° C.

SUMMARY

The disclosure provides a trirutile $Co_{0.5}Ti_{0.5}TaO_4$ microwave dielectric ceramic material and a method for preparing the same.

The ceramic material provided by the disclosure comprises $Co_{0.5}Ti_{0.5}TaO_4$, has a moderate dielectric constant of 36-41, and a low loss to $4.3 \times 10^{-4}$. The raw material for preparing the ceramic material comprises $Co_2O_3$, $TiO_2$ and $Ta_2O_5$. The ceramic material is prepared by solid-state method.

A method of preparing the ceramic material comprises:
1) weighting and mixing raw powders of $Co_2O_3$, $TiO_2$ and $Ta_2O_5$ proportioned according to the chemical formula of $Co_{0.5}Ti_{0.5}TaO_4$, to yield a mixture;
2) mixing the mixture obtained in 1), zirconia balls, and deionized water according to a mass ratio of 1:4-6:3-6, ball-milling for 6-8 h, drying at 80-120° C., sieving with a 60-200 mesh sieve, calcining in air atmosphere at 800-1100° C. for 3-5 h, to yield powders comprising a main crystalline phase of $Co_{0.5}Ti_{0.5}TaO_4$; and
3) mixing the powders obtained in 2), zirconia balls, and deionized water according to a mass ratio of 1:3-5:2-4, ball-milling for 4-6 h, and drying at 80-100° C.; adding a 2-5 wt. % of polyvinyl alcohol solution to a resulting product, granulating, sintering resulting granules at 1000-1100° C. in air atmosphere for 4-6 h, to yield $Co_{0.5}Ti_{0.5}TaO_4$ ceramics.

The sintering temperature of the trirutile $Co_{0.5}Ti_{0.5}TaO_4$ microwave dielectric ceramic material is 1000-1100° C.

DETAILED DESCRIPTION OF THE IMPLEMENTATIONS

To further illustrate, embodiments detailing a ceramic material are described below. It should be noted that the following embodiments are intended to describe and not to limit the disclosure.

1) Weighting raw powders of $Co_2O_3$, $TiO_2$ and $Ta_2O_5$ proportioned according to the chemical formula of $Co_{0.5}Ti_{0.5}TaO_4$.

2) Mixing and ball-milling the mixture obtained in 1), zirconia balls, and deionized water according to a mass ratio of 1:5:2. Thereafter, drying the slurry at 100° C. and then sieving the mixture with a 200-mesh sieve. Calcining the obtained mixture in air atmosphere at 1100° C. for 4 h to synthesize main crystalline phase of $Co_{0.5}Ti_{0.5}TaO_4$.

3) Mixing the powders obtained in 2), zirconia balls, and deionized water according to a mass ratio of 1:5:2, ball-milling for 4 h, and then drying at 100° C. After drying, adding polyvinyl alcohol (2 wt. % PVA) solution into the obtained powder as a binder and putting into a cylinder mold at 20 megapascal for 30 s to form pellets. Thereafter, sintering the cylindrical samples at 1000-1100° C. in air atmosphere for 6 h to prepare $Co_{0.5}Ti_{0.5}TaO_4$ ceramics.

Figure 1:
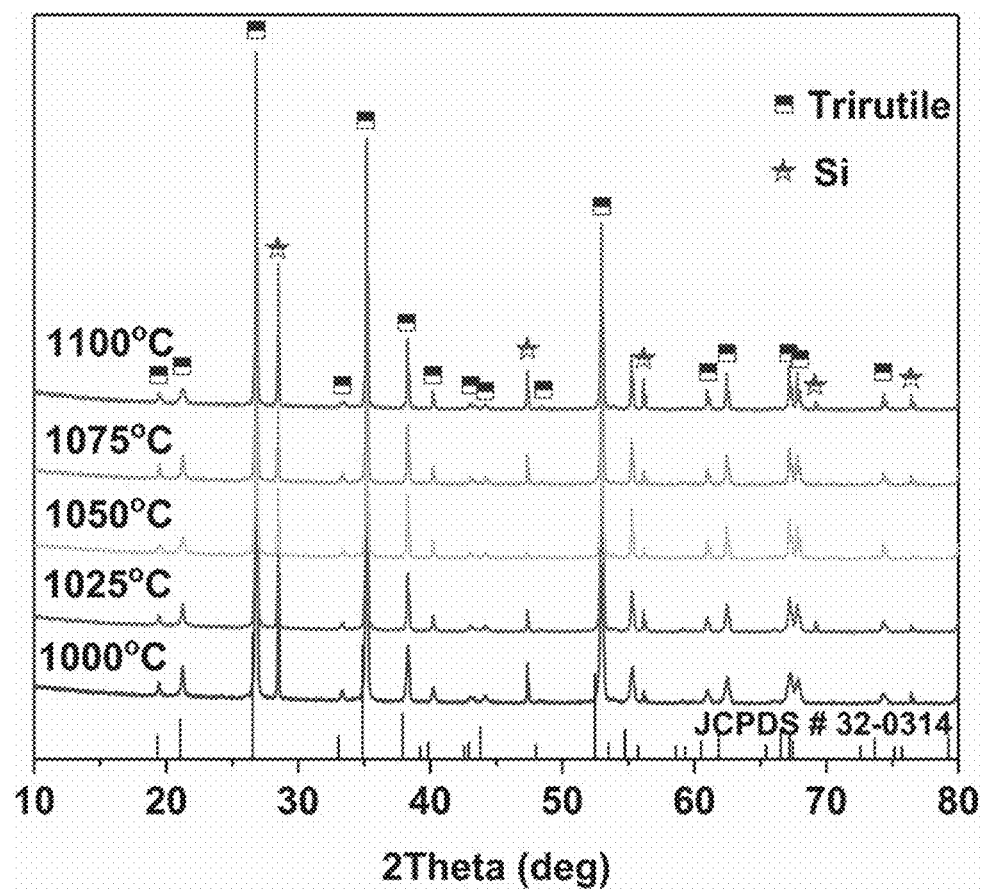
FIG. 1 shows the X-ray diffraction patterns of ceramic materials in Examples 1 to 5 prepared in different sintering temperatures.

FIG. 1 shows the X-ray diffraction patterns of ceramic materials in Examples 1 to 5 prepared in different sintering temperatures, where the Si powder was used as an internal standard to calibrate the experiment and instrument errors. At different sintering temperatures, the diffraction peaks of samples matched with trirutile phase $CoTa_2O_6$ phase (JCPDS card No. 32-0314), indicating that trirutile solid solution $Co_{0.5}Ti_{0.5}TaO_4$ was formed at this time. However, the position of actual diffraction peak shifted to higher angle. According to Bragg's law, the right shift of peak position was attributed to the decrease of cell volume. Compared with $CoTa_2O_6$, the ionic radius of $Ti^{4+}$ ions in $Co_{0.5}Ti_{0.5}TaO_4$ phase was smaller than that of $Co^{2+}$ and $Ta^{5+}$ ions at the same coordination number. Correspondingly, the cell volume decreases, and the diffraction peak shifted to higher angle.

Figure 2:
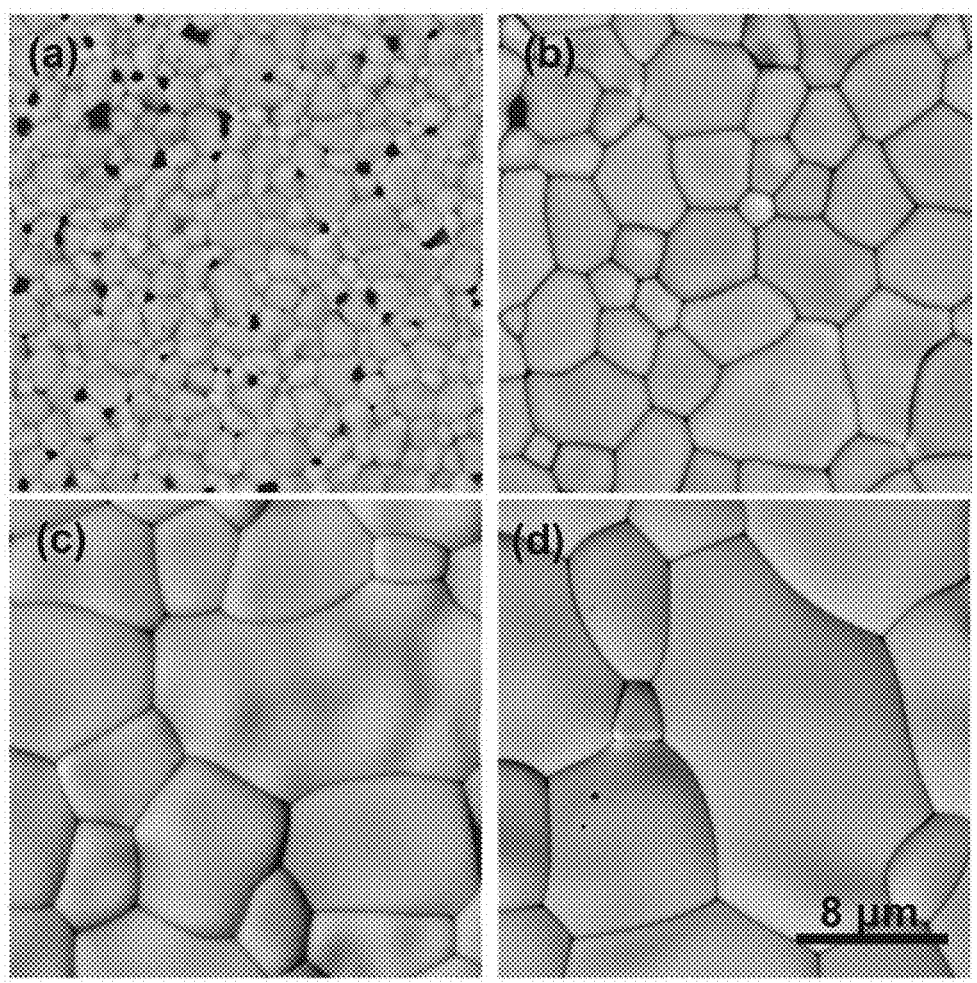
FIG. 2 shows the scanning electron microscope images of the surface morphology of ceramic materials in Examples 1, 3, 4 and 5.

FIG. 2 shows the scanning electron microscope images of the surface morphology of ceramic materials in Examples 1, 3, 4 and 5. Obviously, with the increase of the sintering temperature, the amounts of micropores decreased, the densifications increased, and the grain size increased from 1.42 to 10.86 μm.

TABLE 1

The raw materials of ceramic materials in Examples 1-5

| | Examples | | | | |
|---|---|---|---|---|---|
| | 1 | 2 | 3 | 4 | 5 |
| Calcined temperature ° C. | | | 1000 | | |
| Sintering temperature | 1000 | 1025 | 1050 | 1075 | 1100 |

TABLE 1-continued

The raw materials of ceramic materials in Examples 1-5

| | | Examples | | | | |
|---|---|---|---|---|---|---|
| | | 1 | 2 | 3 | 4 | 5 |
| Mass/g | $Co_2O_3$ | 13.715 | 13.715 | 13.715 | 13.715 | 13.715 |
| | $TiO_2$ | 13.208 | 13.208 | 13.208 | 13.208 | 13.208 |
| | $Ta_2O_5$ | 73.077 | 73.077 | 73.077 | 73.077 | 73.077 |

TABLE 2

The properties of ceramic materials in Examples 1-5

| Examples | External diameter (mm) | Thickness (mm) | Dielectric constant ($\epsilon_r$) | Tanδ ($10^{-4}$) | Q × f (GHz) | $\tau_f$ (ppm/° C.) |
|---|---|---|---|---|---|---|
| 1 | 10.48 | 5.30 | 36.51 | 5.89 | 13135 | 116.03 |
| 2 | 10.30 | 5.10 | 39.19 | 4.26 | 17068 | 113.06 |
| 3 | 10.20 | 5.13 | 39.43 | 4.62 | 17201 | 114.03 |
| 4 | 10.16 | 4.94 | 40.69 | 4.31 | 17291 | 114.54 |
| 5 | 10.30 | 5.04 | 39.38 | 4.32 | 17174 | 115.33 |

From the above tables, it can be seen that the sample in Example 1 was not well-sintered because of its high loss, low dielectric and small shrinkage. With the further increase of sintering temperature, it can be seen from Examples 2-4 that the sample shrunk obviously, and the dielectric constant and quality factor were significantly improved. Combining with the scanning electron microscope images, the sample became densification. However, with the sintering temperature further increasing (Example 5), the shrinkages of samples decreased, the dielectric constant and the quality factor decreased as well. The abnormal growth of grain size in the scanning electron microscope image indicated that the sample had been over-burned at this time, and the excessive sintering temperature would be detrimental to the development of the dielectric properties of samples.

It will be obvious to those skilled in the art that changes and modifications may be made, and therefore, the aim in the appended claims is to cover all such changes and modifications.

What is claimed is:

1. A ceramic material, comprising $Co_{0.5}Ti_{0.5}TaO_4$ having a trirutile structure.

2. The ceramic material of claim 1, wherein the ceramic material is prepared through a method comprising:
   1) weighting and mixing raw powders of $Co_2O_3$, $TiO_2$ and $Ta_2O_5$ proportioned according to the chemical formula of $CO_{0.5}Ti_{0.5}TaO_4$, to yield a mixture;
   2) mixing the mixture obtained in 1), zirconia balls, and deionized water according to a mass ratio of 1: 4-6: 3-6, ball-milling for 6-8 h, drying at 80-120° C., sieving with a 60-200 mesh sieve, calcining in air atmosphere at 800-1100° C. for 3-5 h, to yield powders comprising a main crystalline phase of $Co_{0.5}Ti_{0.5}TaO_4$; and
   3) mixing the powders obtained in 2), zirconia balls, and deionized water according to a mass ratio of 1: 3-5: 2-4, ball-milling for 4-6 h, and drying at 80-100° C., adding a 2-5 wt. % of polyvinyl alcohol solution to a resulting product, granulating, sintering resulting granules at 1000-1100° C. in air atmosphere for 4-6 h, to yield the ceramic material.

3. The ceramic material of claim 2, wherein a dielectric constant of the ceramic material is between 36 and 41.

4. The ceramic material of claim 2, wherein a quality factor (Q×f) of the ceramic material is between 13135 and 17291 GHz.

5. The ceramic material of claim 2, wherein a temperature coefficient of resonant frequency of the ceramic material is between 113 and 116 ppm/° C.

* * * * *